(12) United States Patent
Korzhenko et al.

(10) Patent No.: US 10,125,243 B2
(45) Date of Patent: *Nov. 13, 2018

(54) COMPOSITE MATERIAL HAVING A VERY LOW CONTENT OF CARBON-BASED NANOFILLERS, PROCESS FOR THE PREPARATION THEREOF AND USES THEREOF

(71) Applicant: ARKEMA FRANCE, Colombes (FR)

(72) Inventors: Alexander Korzhenko, Pau (FR); Patrick Delprat, Lescar (FR); Catherine Bluteau, Pau (FR); Andriy Tymoshenko, Pau (FR); Anatolly Goryachkin, Pau (FR); Dmitry Zakharov, Pau (FR)

(73) Assignee: ARKEMA FRANCE, Colombes (FR)

( * ) Notice: Subject to any disclaimer, the term of this patent is extended or adjusted under 35 U.S.C. 154(b) by 639 days.

This patent is subject to a terminal disclaimer.

(21) Appl. No.: 14/405,069

(22) PCT Filed: Jun. 3, 2013

(86) PCT No.: PCT/FR2013/051244
§ 371 (c)(1),
(2) Date: Dec. 2, 2014

(87) PCT Pub. No.: WO2013/182792
PCT Pub. Date: Dec. 12, 2013

(65) Prior Publication Data
US 2015/0147506 A1 May 28, 2015

Related U.S. Application Data

(60) Provisional application No. 61/667,682, filed on Jul. 3, 2012.

(30) Foreign Application Priority Data

Jun. 4, 2012 (FR) ..................... 12 55179

(51) Int. Cl.
| | | |
|---|---|---|
| C08K 3/04 | (2006.01) | |
| C08L 23/12 | (2006.01) | |
| C08K 7/06 | (2006.01) | |
| C08J 3/22 | (2006.01) | |
| C08L 23/02 | (2006.01) | |
| B29C 70/12 | (2006.01) | |
| C08L 23/04 | (2006.01) | |
| C08L 23/10 | (2006.01) | |
| B29C 47/44 | (2006.01) | |

(Continued)

(52) U.S. Cl.
CPC ............... *C08K 7/06* (2013.01); *B29B 7/38* (2013.01); *B29C 47/44* (2013.01); *B29C 47/6087* (2013.01); *B29C 70/12* (2013.01); *C08J 3/22* (2013.01); *C08J 3/226* (2013.01); *C08J 5/005* (2013.01); *C08K 3/041* (2017.05); *C08L 23/02* (2013.01); *C08L 23/04* (2013.01); *C08L 23/10* (2013.01); *C08J 2323/06* (2013.01); *C08J 2323/12* (2013.01); *C08K 3/042* (2017.05); *C08K 3/046* (2017.05); *C08K 2201/011* (2013.01); *Y10T 428/1372* (2015.01); *Y10T 442/60* (2015.04)

(58) Field of Classification Search
CPC ..... C08J 3/22; C08J 3/226; C08J 3/041; C08J 2323/06; C08J 2323/12; C08J 2423/06; C08J 5/005; C08K 2201/011; C08K 3/04; C08K 3/041; C08K 3/042; C08K 3/046; C08K 7/06; B82Y 10/00; C08L 23/02; C08L 23/04; C08L 23/10; B29C 70/12; Y10T 428/1372; Y10T 442/60
USPC ................ 523/351; 428/297.4, 299.1, 301.4
See application file for complete search history.

(56) References Cited

U.S. PATENT DOCUMENTS

| | | |
|---|---|---|
| 2003/0158323 A1 | 8/2003 | Connell et al. |
| 2003/0213939 A1 | 11/2003 | Narayan et al. |

(Continued)

FOREIGN PATENT DOCUMENTS

| | | |
|---|---|---|
| EP | 1719804 A1 | 11/2006 |
| EP | 1777259 A1 | 4/2007 |

(Continued)

OTHER PUBLICATIONS

Rosa et al., CNT-dispersion and precursor synthesis for electrospinning of polymer-CNT composites, Proceedings SPIE 8107, Nano-Opto-Mechanical Systems (NOMA), 8107 (Sep. 1, 2011).*

(Continued)

*Primary Examiner* — Camie S Thompson
(74) *Attorney, Agent, or Firm* — Buchanan Ingersoll & Rooney P.C.

(57) ABSTRACT

A composite material containing a polymer composition and a very low concentration of carbon nanofillers, in particular carbon nanotubes, having improved mechanical properties. The method for producing said composite material and to the different uses thereof. The use of carbon nanofillers at a concentration of between 0.1 ppm and 99 ppm in order to improve mechanical properties, in particular the tensile properties of a polymer matrix encasing at least one polymer selected from a thermoplastic polymer alone or mixed with an elastomer resin base, while facilitating the shaping thereof into composite parts using any suitable technique, in particular injection, extrusion, compression or molding, and while improving the electrostatic dissipation capability thereof.

6 Claims, No Drawings

(51) Int. Cl.
*B29C 47/60* (2006.01)
*B29B 7/38* (2006.01)
*C08J 5/00* (2006.01)

(56) References Cited

U.S. PATENT DOCUMENTS

| | | | |
|---|---|---|---|
| 2004/0152806 A1* | 8/2004 | Koga | C08K 5/103 |
| | | | 524/115 |
| 2004/0211942 A1 | 10/2004 | Clark et al. | |
| 2004/0234445 A1 | 11/2004 | Serp et al. | |
| 2005/0029498 A1 | 2/2005 | Elkovitch et al. | |
| 2005/0038225 A1 | 2/2005 | Charati et al. | |
| 2006/0112512 A1 | 6/2006 | McNeil | |
| 2007/0129481 A1 | 6/2007 | Yamaguchi et al. | |
| 2008/0312364 A1 | 12/2008 | Piccione et al. | |
| 2010/0078600 A1 | 4/2010 | Connell et al. | |
| 2010/0084618 A1 | 4/2010 | Connell et al. | |
| 2010/0178477 A1* | 7/2010 | Jacobs | B32B 27/32 |
| | | | 428/212 |
| 2010/0201023 A1* | 8/2010 | Piccione | B82Y 30/00 |
| | | | 264/117 |
| 2010/0243965 A1 | 9/2010 | Korzhenko et al. | |
| 2010/0264376 A1 | 10/2010 | Korzhenko et al. | |
| 2011/0121241 A1 | 5/2011 | Bordere et al. | |
| 2011/0201731 A1 | 8/2011 | Korzhenko et al. | |
| 2011/0292502 A1 | 12/2011 | Meyer et al. | |
| 2011/0293921 A1 | 12/2011 | Meyer et al. | |
| 2011/0301282 A1* | 12/2011 | Magni | B82Y 30/00 |
| | | | 524/528 |
| 2012/0010339 A1* | 1/2012 | Xie | C08K 3/04 |
| | | | 524/251 |
| 2015/0118430 A1* | 4/2015 | Korzhenko | C08K 3/04 |
| | | | 428/36.9 |

FOREIGN PATENT DOCUMENTS

| | | |
|---|---|---|
| EP | 1980530 A1 | 10/2008 |
| EP | 1995274 A1 | 11/2008 |
| EP | 2 236 551 A1 | 10/2010 |
| JP | 2003-286350 A | 10/2003 |
| JP | 2007-126578 A | 5/2007 |
| JP | 2007-238793 A | 9/2007 |
| JP | 2011-173957 A | 9/2011 |
| KR | 2009-0065111 A | 6/2009 |
| WO | WO 03/002456 A2 | 1/2003 |
| WO | WO 03/040026 A2 | 5/2003 |
| WO | WO 03/085681 A1 | 10/2003 |
| WO | WO 2004/097852 A1 | 11/2004 |
| WO | WO 2005/015574 A1 | 2/2005 |
| WO | WO 2005/044865 A2 | 5/2005 |
| WO | WO 2010/046606 A1 | 4/2010 |
| WO | WO 2010/109118 A1 | 9/2010 |
| WO | WO 2010/109119 A1 | 9/2010 |
| WO | WO 2011/141366 A1 | 11/2011 |
| WO | WO 2011/141369 A1 | 11/2011 |

OTHER PUBLICATIONS

International Search Report (PCT/ISA/210) dated Sep. 16, 2013, by the European Patent Office as the International Searching Authority for International Application No. PCT/FR2013/051244.
International Search Report (PCT/ISA/210) dated Sep. 27, 2013, by the European Patent Office as the International Searching Authority for International Application No. PCT/FR2013/051246.
Written Opinion (PCT/ISA/237) dated Sep. 27, 2013, by the European Patent Office as the International Searching Authority for International Application No. PCT/FR2013/051246.
Written Opinion (PCT/ISA/237) dated Sep. 16, 2013, European by the French Patent Office as the International Searching Authority for International Application No. PCT/FR2013/051244.
Martin-Gullon et al., "Differences between carbon nanofibers produced using Fe and Ni catalysts in a floating catalyst reactor," Carbon 44, 2006, pp. 1572-1580.
Flahaut et al., "Gram-scale CCVD synthesis of double-walled carbon nanotubes," Chem Comm. 2003, pp. 1442-1443.
**Korzhenko et al., U.S. Appl. No. 14/405,068, entitled "Use of Carbon-Based Nanofillers at a Very Low Content for the UV Stabilization of Composite Materials," filed Dec. 2, 2014.

* cited by examiner

COMPOSITE MATERIAL HAVING A VERY LOW CONTENT OF CARBON-BASED NANOFILLERS, PROCESS FOR THE PREPARATION THEREOF AND USES THEREOF

FIELD OF THE INVENTION

The present invention relates to a composite material based on a polymeric composition and on very low contents of carbon-based nano-fillers, in particular of carbon nanotubes, exhibiting improved mechanical properties, and also the process for the preparation thereof and the various uses thereof.

STATE OF THE ART

Carbon nanotubes (or CNTs) are known and have specific crystalline structures, of hollow and closed tubular form, obtained from carbon. CNTs generally consist of one or more graphite sheets arranged concentrically around a longitudinal axis. A distinction is thus made between Single Wall Nanotubes (SWNTs) and Multi-Wall Nanotubes (MWNTs).

CNTs are commercially available or can be prepared by known methods. Several processes exist for the synthesis of CNTs, in particular electrical discharge, laser ablation and Chemical Vapour Deposition (CVD). This CVD process consists specifically in injecting a carbon source at relatively high temperature onto a catalyst which can consist of a metal, such as iron, cobalt, nickel or molybdenum, supported on an inorganic solid, such as alumina, silica or magnesia. The carbon sources can comprise methane, ethane, ethylene, acetylene, ethanol, methanol, indeed even a mixture of carbon monoxide and hydrogen.

From a mechanical point of view, CNTs exhibit both an excellent stiffness (measured by the Young's modulus), comparable to that of steel, while being extremely light. In addition, they exhibit excellent electrical and thermal conductivity properties which make it possible to envisage using them as additives for conferring these properties on various materials, in particular macromolecular materials, such as thermoplastic polymers, elastomers and other thermosetting polymers.

However, CNTs prove to be difficult to handle and to disperse, due to their small size, their dusty nature and possibly, when they are obtained by the CVD technique, their entangled structure, all the more so when it is desired to increase their mass productivity for the purposes of improving the production and of reducing the residual ash content. The existence of strong Van der Waals interactions between the nanotubes is also harmful to the dispersibility thereof and to the stability of the composite materials obtained.

The poor dispersibility of CNTs has a significant effect on the characteristics of the composites which they form with the polymer matrices into which they are introduced. The appearance is observed in particular of nanocracks, which are formed at aggregates of nanotubes and which result in the composite becoming embrittled. Furthermore, insofar as CNTs are poorly dispersed, it is necessary to increase their content in order to achieve a given electrical and/or thermal conductivity.

To this end, CNTs are used mainly for their electrical properties today at a relatively high content, generally greater than 0.5% by weight.

Given the technical difficulties in incorporating CNTs in polymeric matrices, their effects have not been fully explored.

In order to overcome the poor dispersibility of CNTs, which is capable of significantly affecting the characteristics of the polymeric matrices into which they are introduced, various solutions have been proposed in the state of the art. Mention may be made, among these, of sonication, which however only has a temporary effect, or ultrasonication, which has the effect of in part cutting the nanotubes and of creating oxygen-comprising functional groups which can affect some of their properties, or mention may also be made of techniques for grafting or functionalizing the CNTs which, however, exhibit the disadvantage of generally being carried out under aggressive conditions capable of damaging, indeed even destroying, the nanotubes.

More recently, the latest developments have related to the preparation of masterbatches comprising carbon nanotubes at high contents, efficiently and homogeneously dispersed on industrial scale, in a polymeric matrix, based on a thermoplastic polymer, an elastomer or a thermosetting resin. Mention may be made, for example, of the documents on behalf of the Applicant Company which describe such preparation processes, EP 1 995 274; WO 2010/046606; WO 2010/109118 and WO 2010/109119.

These masterbatches, comprising a high content of carbon nanotubes, can subsequently be easily handled and then diluted in polymer matrices to form completely homogeneous composite materials having a low CNT content which are intended for the manufacture of composite parts.

Surprisingly, it has now been discovered that the incorporation of carbon-based nanofillers, such as carbon nanotubes, in a polymer matrix at an extremely low content, of less than 0.01% by weight, makes it possible to improve the mechanical properties thereof, in particular the tensile properties thereof, or to confer thereon novel properties during the conversion thereof into composite parts.

Documents WO 2004/097852, WO 2005/015574 and WO 03/085681 describe compositions based on a polymer matrix and on carbon nanotubes at a content that may range from 0.001% to 50%. They relate to imparting conductive properties to the polymer matrix. There is no question at all, in these teachings, of improving the mechanical properties of a composite material with contents of carbon-based nanofillers of less than 0.01%.

An aim of the present invention is thus to provide a composite material having a very low content of carbon-based nanofillers which exhibits improved mechanical properties, a process for the preparation of the said composite material and the various uses thereof.

SUMMARY OF THE INVENTION

More specifically, a subject-matter of the invention is a composite material comprising a polymeric composition and carbon-based nanofillers chosen from carbon nanotubes, carbon nanofibres, graphene or a mixture of these in all proportions, characterized in that the content by weight of carbon-based nanofillers is between 0.1 ppm and 99 ppm.

According to the invention, the composite material comprises a polymeric composition comprising a polymer matrix including at least one thermoplastic polymer chosen from homo- and copolymers of olefins, such as polyethylene, polypropylene, polybutadiene, polybutylene and acrylonitrile-butadiene-styrene copolymers; acrylic homo- and copolymers and poly(alkyl (meth)acrylate)s, such as poly (methyl methacrylate); homo- and copolyamides; polycarbonates; poly(ethylene terephthalate); poly(butylene terephthalate); polyethers, such as poly(phenylene ether), poly(oxymethylene) and poly(oxyethylene) or poly(ethylene glycol); polystyrene; copolymers of styrene and maleic anhydride; poly(vinyl chloride); fluoropolymers, such as poly(vinylidene fluoride), polytetrafluoroethylene and polychlorotrifluoroethylene; natural or synthetic rubbers; thermoplastic polyurethanes; polyaryletherketones (PAEKs) such as polyetheretherketone (PEEK) and polyetherketoneketone (PEKK); polyetherimide; polysulphone; poly(phenylene sulphide); cellulose acetate; poly(vinyl acetate); and their blends; possibly as a blend with an elastomeric resin base.

Another subject-matter of the invention is a process for the preparation of a composite material comprising a polymeric composition and carbon-based nanofillers, comprising the following stages:

a) the introduction into and then kneading in a compounding device of a masterbatch concentrated in carbon-based nanofillers, with a polymeric matrix, in order to obtain a precomposite comprising from 0.25% to 3% by mass of carbon-based nanofillers;

b) optionally the conversion of the precomposite in the agglomerated solid form, such as granules or milled powder;

c) the introduction of the precomposite into a polymer matrix including at least one polymer chosen from a thermoplastic polymer, alone or as a blend with an elastomer resin base, in order to obtain a composite material.

The composite material capable of being obtained according to this process can comprise from 0.1 ppm to 0.25% by mass of carbon-based nanofillers, preferably from 0.1 ppm to 0.1% by mass of carbon-based nanofillers and more preferably from 0.1 ppm to 99 ppm.

Another subject-matter of the invention is the use of the composite material according to the invention or capable of being obtained according to the process according to the invention in the manufacture of various composite products, such as yarns, films, tubes, fibres, nonwovens, such as fabrics or felts, which products can be used for optical fibre conduits, machining of cables, waste or industrial water or gas pipes, extruded or moulded coatings, articles manufactured by injection moulding, extrusion, compression or moulding, in the motor vehicle sector (parts under the bonnet, external or internal parts, leak tightness, and the like) or in the field of agriculture, in particular for protecting agricultural land (greenhouse and soils).

The invention also applies to the use of carbon-based nanofillers, chosen from carbon nanotubes, carbon nanofibres, graphene or a mixture of these in all proportions, having a content of between 0.1 ppm and 99 ppm for improving the mechanical properties, in particular the tensile properties, of a polymer matrix including at least one polymer chosen from a thermoplastic polymer, alone or as a blend with an elastomer resin base, while facilitating the forming thereof into composite parts according to any appropriate technique, in particular by injection moulding, extrusion, compression, moulding or the spinning of fibres, and while improving its electrostatic dissipation capacity during the production of these composite parts.

DETAILED DESCRIPTION

Composite Material

The composite material according to the invention comprises carbon-based nanofillers and a polymeric composition. These constituents will now be described in more detail.

The Carbon-Based Nanofillers

According to the invention, the carbon-based nanofillers are chosen from carbon nanotubes, carbon nanofibres, graphene or a mixture of these in all proportions.

The carbon nanotubes can be of the single wall, double wall or multi-wall type. The double wall nanotubes can be prepared in particular as described by Flahaut et al. in Chem. Comm. (2003), 1442. The multi-wall nanotubes can for their part be prepared as described in the document WO 03/02456. Preference is given, according to the invention, to multi-wall carbon nanotubes obtained according to a chemical vapour deposition (or CVD) process, by catalytic decomposition of a carbon source (preferably of vegetable origin), such as described in particular in Application EP 1 980 530 of the Applicant Company.

The nanotubes usually have a mean diameter ranging from 0.1 to 100 nm, preferably from 0.4 to 50 nm and better still from 1 to 30 nm, indeed even from 10 to 15 nm, and advantageously a length from 0.1 to 10 μm. Their length/diameter ratio is preferably greater than 10 and generally greater than 100. Their specific surface is, for example, between 100 and 300 $m^2/g$, advantageously between 200 and 300 $m^2/g$, and their bulk density can in particular be between 0.05 and 0.5 $g/cm^3$ and more preferably between 0.1 and 0.2 $g/cm^3$. The multi-wall nanotubes can, for example, comprise from 5 to 15 sheets (or walls) and more preferably from 7 to 10 sheets. These nanotubes may or may not be treated.

An example of crude carbon nanotubes is in particular commercially available from Arkema under the trade name Graphistrength® C100.

These nanotubes can be purified and/or treated (for example oxidized) and/or functionalized before they are employed in the process according to the invention.

The nanotubes can be purified by washing with a solution of sulphuric acid, so as to free them from possible residual inorganic and metallic impurities, such as, for example, iron originating from the process for the preparation thereof. The ratio by weight of the nanotubes to the sulphuric acid can be in particular be between 1:2 and 1:3. The purification operation can furthermore be carried out at a temperature ranging from 90 to 120° C., for example for a time of 5 to 10 hours. This operation can advantageously be followed by stages of rinsing with water and of drying the purified nanotubes. In an alternative form, the nanotubes can be purified by a heat treatment at a high temperature, typically of greater than 1000° C.

The oxidation of the nanotubes is advantageously carried out by brining the latter into contact with a sodium hypochlorite solution including from 0.5 to 15% by weight of NaOCl and preferably from 1 to 10% by weight of NaOCl, for example in a ratio by weight of the nanotubes to the sodium hypochlorite ranging from 1:0.1 to 1:1. The oxidation is advantageously carried out at a temperature of less than 60° C. and preferably at ambient temperature, for a time ranging from a few minutes to 24 hours. This oxidation operation can advantageously be followed by stages of filtering and/or centrifuging, washing and drying the oxidized nanotubes.

The nanotubes can be functionalized by grafting reactive units, such as vinyl monomers, to the surface of the nanotubes. The constituent material of the nanotubes is used as radical polymerization initiator after having been subjected to a heat treatment at more than 900° C., in an anhydrous and oxygen-free medium, which is intended to remove the oxygen-comprising groups from its surface. It is thus possible to polymerize methyl methacrylate or hydroxyethyl methacrylate at the surface of carbon nanotubes with a view to facilitating in particular the dispersion thereof in PVDF.

Use may be made, in the present invention, of crude nanotubes, that is to say nanotubes which are neither oxidized nor purified nor functionalized and which have not been subjected to any other chemical and/or heat treatment. In an alternative form, use may be made of purified nanotubes, in particular purified by heat treatment at high temperature. Furthermore, it is preferable for the carbon nanotubes not to have been milled.

The carbon nanofibres are, like the carbon nanotubes, nanofilaments produced by chemical vapour deposition (or CVD) from a carbon-based source which is decomposed on a catalyst comprising a transition metal (Fe, Ni, Co, Cu), in the presence of hydrogen, at temperatures from 500 to 1200° C. However, these two carbon-based fillers differ in their structure (I. Martin-Gullon et al., Carbon, 44 (2006) 1572-1580). This is because carbon nanotubes consist of one or more graphene sheets wound concentrically around the axis of the fibre to form a cylinder having a diameter of 10 to 100 nm. In contrast, carbon nanofibres are composed of relatively organized graphitic regions (or turbostratic stacks), the planes of which are inclined at variable angles with respect to the axis of the fibre. These stacks can take the form of platelets, fish bones or dishes stacked in order to form structures having a diameter generally ranging from 100 nm to 500 nm, indeed even more.

Preference is given to the use of carbon nanofibres having a diameter from 100 to 200 nm, for example of approximately 150 nm (VGCF® from Showa Denko), and advantageously a length from 100 to 200 µm.

The term "graphene" denotes a flat, isolated and separate sheet of graphite but also, by extension, an assembly comprising between one sheet and several tens of sheets and exhibiting a flat or relatively undulating structure. Each sheet of graphene is formed of carbon atoms bonded to one another via C—C bonds of $sp^2$ type, forming a two-dimensional hexagonal network.

Generally, the graphene used in the invention is provided in the form of solid particles of nanometric size exhibiting a thickness of less than 15 nm and at least one lateral dimension substantially perpendicular to the said thickness of between 0.1 µm and 500 µm, and comprising from 1 to 50 sheets, the said sheets being capable of being detached from one another in the form of independent sheets, for example during a treatment with ultrasound.

According to a preferred embodiment of the invention, the carbon-based nanofillers comprise carbon nanotubes, preferably multi-wall carbon nanotubes obtained according to a chemical vapour deposition process, alone or as a mixture with graphene.

The amount of carbon-based nanofillers in the composite material of the invention is between 0.1 ppm and 99 ppm and preferably between 1 ppm and 95 ppm.

The Polymeric Composition

According to the invention, the polymeric composition comprises a polymer matrix including at least one thermoplastic polymer, alone or as a blend with an elastomeric resin base.

The term "thermoplastic polymer" is understood to mean, within the meaning of the present invention, a polymer which melts when it is heated and which can be shaped and reshaped in the molten state.

This thermoplastic polymer is chosen in particular from: homo- and copolymers of olefins, such as polyethylene, polypropylene, polybutadiene, polybutylene and acrylonitrile-butadiene-styrene copolymers; acrylic homo- and copolymers and poly(alkyl (meth)acrylate)s, such as poly (methyl methacrylate); homo- and copolyamides; polycarbonates; poly(ethylene terephthalate); poly(butylene terephthalate); polyethers, such as poly(phenylene ether), poly(oxymethylene) and poly(oxyethylene) or poly(ethylene glycol); polystyrene; copolymers of styrene and maleic anhydride; poly(vinyl chloride); fluoropolymers, such as poly(vinylidene fluoride), polytetrafluoroethylene and polychlorotrifluoroethylene; natural or synthetic rubbers; thermoplastic polyurethanes; polyaryletherketones (PAEKs) such as polyetheretherketone (PEEK) and polyetherketoneketone (PEKK); polyetherimide; polysulphone; poly (phenylene sulphide); cellulose acetate; poly(vinyl acetate); and their blends.

According to one preferred embodiment of the invention, the polymer is chosen from homo- and copolymers of olefins, in particular polyethylene, polypropylene, polybutadiene, polybutylene and acrylonitrile-butadiene-styrene copolymers, polycarbonates and homo- and copolymers of amides, such as polyamide 6, 6.6, 6.10, 6.12, 11, 12, 10.10, 12.12, 4.6.

According to the invention, the polymeric composition can include a thermoplastic polymer as a blend with an elastomeric resin base. The term "elastomeric resin base" is understood to mean, in the present description, an organic or silicone polymer which forms, after vulcanization, an elastomer capable of withstanding high strains in a virtually reversible fashion, that is to say liable to be subjected to a uniaxial strain, advantageously of at least twice its original length, at ambient temperature (23° C.) for five minutes, and then of recovering, once the stress has been released, its initial size, with a residual strain of less than 10% of its initial size.

From the structural viewpoint, elastomers generally consist of polymeric chains connected to one another to form a three-dimensional network. More specifically, thermoplastic elastomers, in which the polymeric chains are connected to one another via physical bonds, such as hydrogen or dipole-dipole bonds, are sometimes distinguished from thermosetting elastomers, in which these chains are connected via covalent bonds, which constitute chemical crosslinking points. These crosslinking points are formed by vulcanization processes employing a vulcanization agent which can, for example, be chosen, depending on the nature of the elastomer, from sulphur-based vulcanization agents, in the presence of dithiocarbamate metal salts; zinc oxides combined with stearic acid; bifunctional phenol/formaldehyde resins which are optionally halogenated, in the presence of tin chloride or zinc oxide; peroxides; amines; hydrosilanes in the presence of platinum; and the like.

The present invention relates more particularly to the elastomeric resin bases including or consisting of thermosetting elastomers, optionally as a mixture with unreactive elastomers, that is to say nonvulcanizable elastomers (such as hydrogenated rubbers).

The elastomeric resin bases which can be used according to the invention can in particular comprise, indeed even consist of, one or more polymers chosen from: fluorocarbon or fluorosilicone elastomers; homo- and copolymers of butadiene, optionally functionalized by unsaturated monomers, such as maleic anhydride, (meth)acrylic acid, acrylonitrile (NBR) and/or styrene (SBR; SBS; SEBS); neoprene (or polychloroprene); polyisobutylene (FIB); polyisopropylene (PIP); polyisoprene; copolymers of isoprene with styrene, butadiene, acrylonitrile and/or methyl methacrylate; copolymers based on propylene and/or ethylene and in particular terpolymers based on ethylene, propylene and dienes (EPDM), and also the copolymers of these olefins with an alkyl (meth)acrylate or vinyl acetate; natural rubbers (NR); halogenated butyl rubbers; silicone elastomers, such as poly(dimethylsiloxane)s having vinyl ends; polyurethanes (PUs); plastomers comprising $C_4$, $C_5$, $C_6$, $C_8$, $C_9$ or $C_{12}$ olefins; polyesters; acrylic polymers, such as poly(butyl acrylate) carrying carboxylic acid or epoxy functional groups; and their modified or functionalized derivatives and their blends, without this list being limiting.

It is preferable to use, according to the invention, the elastomeric resins EPDM, SBR, SBS, SEBS, NBR, NR, FIB, PIP or PU, or the $C_4$, $C_5$, $C_6$, $C_8$, $C_9$ or $C_{12}$ plastomers, or their blends in all proportions.

According to a preferred embodiment of the invention, the polymeric composition comprises at least one thermoplastic polymer used alone.

According to the invention, the incorporation of carbon-based nanofillers at very low contents does not make it possible to render the polymeric composition conductive but does make it possible to attain the mechanical properties required for the envisaged applications.

Other Constituents

In addition to the abovementioned constituents, the composite material according to the invention can comprise other additives, in particular chosen from nonpolymeric additives or polymeric additives.

The nonpolymeric additives optionally included in the composite material according to the invention comprise in particular nonpolymeric plasticizers, surfactants, such as sodium dodecylbenzenesulphonate, inorganic fillers, such as silica, titanium dioxide, talc or calcium carbonate, UV screening agents, in particular based on titanium dioxide, flame retardants, solvents for the polymer, heat or light stabilizers, in particular based on phenol or phosphite, and their mixtures.

Mention may be made, as polymeric additives, of dispersing or plasticizing polymers, in particular dispersing polymers which improve the dispersion of the nanofillers in the polymer matrix.

The chemical nature of the dispersant depends on the chemical nature of the polymer matrix to be reinforced by the carbon-based nanofillers. Mention may be made, for example, as dispersants, of cyclic butylene terephthalate oligomers (in particular the CBT® 100 resin from Cyclics), natural waxes, synthetic waxes, polyolefin waxes, fatty acids and their derivatives, esters/amides, saponified fatty acids, zinc stearate, sorbitan esters of acids, glycerol ester, derivatives of organic acids, the organic portion of organosilanes, such as aminosilane, (Struktol® SCA 1100) chloropropylsilane (Struktol® SCA 930), epoxysilane (Struktol® SCA 960), methacryloyloxysilane (Struktol® SCA 974) or vinylsilanes (Struktol® SCA 971 and SCA 972), grafted polymers (Polymer-G-MAH, Polymer-G-GMA), titanates and zirconates (Tyzor), silsesquioxane oligomers (POSS), branched additives and polymers sold under the names Boltorn H20, H30, H40, H20, H30, H40, S 1200, D 2800, P/S80 1200, DEO750 8500, H 1500, H/S80 1700, HV 2680, P 1000, PS 1925, PS 2550, H311, H2004, P500, P1000, W3000, U3000, and others, DSM Hybrane), BYK-C 8000 from Byk Company, and the like.

Preparation Process

A process for the preparation of a composite material comprising a polymeric composition and carbon-based nanofillers, chosen from carbon nanotubes, carbon nanofibres, graphene or a mixture of these in all proportions, according to the present invention will now be described in more detail.

This process comprises a first stage a) of dilution of a masterbatch concentrated in carbon-based nanofillers in a polymeric matrix for the purpose of obtaining a precomposite comprising from 0.25% to 3% of carbon-based nanofillers.

The term "masterbatch concentrated in carbon-based nanofillers" is understood to mean a masterbatch including from 5% to 50% of carbon-based nanofillers, in particular carbon nanotubes, dispersed in a polymeric matrix based on a thermoplastic polymer, on an elastomer resin base and/or on a dispersing polymer.

Mention may be made, among the masterbatches which can be used, for example, of the Graphistrength® CM grades of the Applicant Company, available commercially, in particular the CM 12-30, CM 13-30, CM 1-20, CM 2-20, CM 3-20, CM 6-20 and CM 7-20 grades.

The diluting stage can be carried out by kneading in a compounding device and results directly in a precomposite comprising from 0.25% to 3% of carbon-based nanofillers.

In an alternative form, the diluting stage is carried out in at least two successive stages, in order to refine the dispersion, the first resulting in a precomposite comprising from 2.5% to 10% by mass, preferably from 2.5% to 5% by mass, of carbon-based nanofillers and the second resulting in a precomposite comprising from 0.25% to 3% by mass of carbon-based nanofillers.

According to this alternative form, it is possible to accurately attain very low contents of nanofillers in the dispersion, while avoiding the risk of agglomeration of the carbon-based nanofillers within the dispersion.

The term "compounding device" is understood to mean, in the present description, an appliance conventionally used in the plastics industry. In this appliance, the polymeric composition and the masterbatch are blended using a high shear device, for example an extruder comprising corotating or counterrotating twin screws or a co-kneader.

Examples of co-kneaders which can be used according to the invention are the Buss® MDK 46 co-kneaders and those of the Buss® MKS or MX series, sold by Buss AG, which all consist of a screw shaft provided with flights, which is positioned in a heating barrel optionally consisting of several parts, the internal wall of which is provided with kneading teeth capable of interacting with the flights to produce shearing of the kneaded material. The shaft is rotated, and provided with an oscillatory movement in the axial direction, by a motor. These co-kneaders can be equipped with a system for the manufacture of granules, for example fitted to their outlet orifice, which can consist of an extrusion screw or a pump.

The co-kneaders which can be used according to the invention preferably have a screw L/D ratio ranging from 7 to 22, for example from 10 to 20, while the corotating extruders advantageously have a L/D ratio ranging from 15 to 56, for example from 20 to 50.

Use may be made, as compounding device, in particular in the case where the polymeric matrix comprises a solid elastomer resin base, of a roll (two- or three-roll) mixer or mill.

According to stage a) of the process according to the invention, the introduction, into the compounding device, of the concentrated masterbatch and of the polymeric matrix can be carried out in various ways, either simultaneously in two separate introduction means or successively in one and the same feed zone of the mixer.

The polymeric matrix can be of the same nature as the polymeric matrix constituting the concentrated masterbatch. In an alternative form, the concentrated masterbatch comprises a dispersant and the polymeric matrix can be different from the polymeric matrix constituting the concentrated masterbatch.

On conclusion of stage a), the precomposite can be optionally converted in an agglomerated solid physical from, for example in the form of granules, or of milled powder, or in the form of rods, a strip or a film (stage b).

According to stage c) of the process according to the invention, the precomposite is introduced into a polymer matrix including at least one polymer chosen from a thermoplastic polymer, alone or as a blend with an elastomer resin base, such as described above.

Stage c) can be carried out using any conventional device, in particular using internal mixers or roll (two- or three-roll) mixers or mills. The amount of precomposite introduced into the polymer matrix depends on the content of the carbon-based nanofillers which it is desired to add to this matrix for the purpose of obtaining the mechanical properties desired for the composite material obtained.

This polymer matrix comprises at least one polymer, which can be identical to (or different from) that or those used in the manufacture of the masterbatch or in the preparation of the precomposite, and optionally various additives, for example lubricants, pigments, stabilizing agents, fillers or reinforcing agents, antistatic agents, fungicides, flame-retardant agents, solvents, blowing agents, rheology modifiers and their mixtures.

The composite material obtained can be formed according to any appropriate technique, in particular by injection moulding, extrusion, compression or moulding, followed by a vulcanization or crosslinking treatment in the case where the polymeric matrix comprises an elastomeric resin base.

In an alternative form, the introduction of precomposite into the polymer matrix according to stage c) can be carried out dry, directly into the machine for forming the composite material, such as a injection moulding device.

The composite material according to the invention or capable of being obtained according to the process of the invention exhibits improved mechanical properties, in particular improved tensile properties.

The presence of carbon-based nanofillers at a content as low as from 0.1 ppm to less than 100 ppm improves the electrostatic dissipation capacity of polymer matrices during the manufacture of composite parts (fibres, films, objects etc.) without affecting their mechanical properties and thus makes it possible to more easily form them for the targeted use. In addition, the presence of carbon-based nanofillers substantially improves the presentation of the finished products obtained from the composite material according to the invention, in particular in terms of aspect, surface appearance and optical qualities.

A better understanding of the invention will be obtained in the light of the following nonlimiting and purely illustrative examples.

EXAMPLES

Example 1: Effect of the CNTs on the Mechanical Properties of a Polypropylene

Use was made of the Graphistrength® CM 12-30 grade from Arkema, comprising 30% of CNTs (MWNTs) completely dispersed in a resin. Graphistrength® CM 12-30 was dispersed in PPH polypropylene (with an MFI of 20) using a Buss co-kneader, so as to obtain a precomposite comprising 0.5% by mass of CNTs. This dispersion was produced in 2 stages, the first stage resulting in a precomposite comprising 10% of CNTs and the second stage consisting of diluting in PPH by a factor of 20. The precomposite comprising 0.5% of CNTs was diluted dry with PPH (MFI 20) directly in the forming unit by injection of the composite product, in order to obtain composite materials comprising 25 ppm, 50 ppm and 95 ppm by weight of CNTs, respectively denoted by Composite 1, Composite 2 and Composite 3, which are provided in the form of 6×6×0.3 cm plaques, bars and dumbbells.

These composite products were subjected to tensile tests according to Standard ISO 572-2, carried out starting from small dumbbells H1 on an MTS tensile testing device at a rate of 50 mm/min, for the purpose of comparing their mechanical properties with those of PPH not comprising CNTs.

The results of these tests are collated in Table 1 below.

TABLE 1

|  | PPH (MFI 20) | Composite 1 | Composite 2 | Composite 3 |
|---|---|---|---|---|
| Content of CNTs, ppm | 0 | 25 | 50 | 95 |
| Ultimate strength (MPa) | 26 | 28.1 | 28.5 | 28.9 |
| Strain at break (%) | 40 | 100 | 180 | 300 |

A strong improvement in the tensile properties of the PPH at ambient temperature is found for very low contents of CNTs.

Example 2: Effect of the CNTs on the Static Electricity in an Extrusion Process

A precomposite comprising 0.3% of CNTs in polyethylene was prepared from a masterbatch comprising 2.5% of CNTs in PE by compounding and metered at 95 ppm in an extruder for the production of PE films.

A decrease in electrostatic charge from 400-450 W/m$^2$ to a value of the order of 5-9 W/m$^2$ was observed, which considerably improves the safety level of the appliances and personnel, and renders redundant the use of other systems for electrostatic discharges during the manufacture of the composite parts or objects.

The invention claimed is:

1. Process for the preparation of a composite material comprising a polymeric composition and carbon-based nanofillers selected from the group consisting of carbon nanotubes, carbon nanofibres, graphene, and mixtures thereof,
    wherein a content by weight of carbon-based nanofillers is between 1 ppm and 95 ppm,
    wherein the polymeric composition comprises a polymer matrix including at least one thermoplastic polymer selected from the group consisting of homo- and copolymers of olefins; acrylic homo- and copolymers and poly(alkyl (meth)acrylate)s; homo- and copolyamides; poly(ethylene terephthalate); poly(butylene terephthalate); polyethers; polystyrene; copolymers of styrene and maleic anhydride; poly(vinyl chloride); fluoropolymers; natural or synthetic rubbers; thermoplastic polyurethanes; polyaryletherketones (PAEKs); polyetherimide; polysulphone; poly(phenylene sulphide); cellulose acetate; poly(vinyl acetate); and mixtures thereof; and optionally, an elastomeric resin base;
    wherein the composite is free from polycarbonate; and wherein the composite material is not electrically conductive, the process comprising the following stages:

a) introducing into and then kneading in a compounding device of a masterbatch concentrated in the carbon-based nanofillers, with the polymeric matrix, in order to obtain a precomposite comprising from 0.25% to 0.50% by mass of carbon-based nanofillers;

b) optionally converting the precomposite in agglomerated solid form;

c) introducing the precomposite into the polymer matrix in order to obtain the composite material.

2. Process for the preparation of a composite material according to claim 1, wherein stage a) is carried out in at least two successive stages, the first resulting in a precomposite comprising from 2.5% to 10% by mass of carbon-based nanofillers and the second resulting in the precomposite comprising from 0.25% to 3% by mass of carbon-based nanofillers.

3. Process for the preparation of a composite material according to claim 1, wherein the polymeric matrix of stage a) is identical to the polymer matrix of stage c).

4. Process for the preparation of a composite material according to claim 1, wherein the introduction of precomposite into the polymer matrix according to stage c) is carried out dry, directly into the machine for forming the composite material.

5. Process for the preparation of a composite material, the process comprising the following stages:

a) introducing into and then kneading in a compounding device of a masterbatch concentrated in carbon-based nanofillers, with a polymeric matrix, in order to obtain a precomposite comprising from 0.25% to 0.50% by mass of carbon-based nanofillers;

b) optionally converting the precomposite in agglomerated solid form;

c) introducing the precomposite into the polymer matrix in order to obtain the composite material, wherein the carbon-based nanofillers are selected from the group consisting of carbon nanotubes, carbon nanofibres, graphene, and mixtures thereof, wherein a content by weight of carbon-based nanofillers is between 1 ppm and 95 ppm, wherein the polymeric composition comprises a polymer matrix including at least one thermoplastic polymer selected from the group consisting of homo- and copolymers of olefins; acrylic homo- and copolymers and poly(alkyl (meth)acrylate)s; homo- and copolyamides; polycarbonates; poly(ethylene terephthalate); poly(butylene terephthalate); polyethers; polystyrene; copolymers of styrene and maleic anhydride; poly(vinyl chloride); fluoropolymers; natural or synthetic rubbers; thermoplastic polyurethanes; polyaryletherketones (PAEKs); polyetherimide; polysulphone; poly(phenylene sulphide); cellulose acetate; poly(vinyl acetate); and mixtures thereof; and optionally, an elastomeric resin base; and wherein the composite material is not electrically conductive.

6. The process of claim 5, wherein the thermoplastic polymer is selected from the group consisting of homo- and copolymers of olefins, polycarbonates, and homo- and copolymers of amides.

* * * * *